(12) United States Patent
Kim et al.

(10) Patent No.: US 8,989,027 B2
(45) Date of Patent: Mar. 24, 2015

(54) DEVICE AND METHOD FOR CONTROLLING DRIVE TEST IN WIRELESS COMMUNICATION SYSTEM

(75) Inventors: Sang Bum Kim, Seoul (KR); Soeng Hun Kim, Yongin-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 13/211,606

(22) Filed: Aug. 17, 2011

(65) Prior Publication Data

US 2012/0044822 A1 Feb. 23, 2012

(30) Foreign Application Priority Data

Aug. 20, 2010 (KR) ........................ 10-2010-0080946

(51) Int. Cl.
*H04W 24/10* (2009.01)
*H04W 76/04* (2009.01)

(52) U.S. Cl.
CPC ............ *H04W 24/10* (2013.01); *H04W 76/048* (2013.01)
USPC ........... 370/252; 370/242; 370/244; 370/245; 370/248; 370/251; 455/423; 455/424; 455/425

(58) Field of Classification Search
USPC ........................................................ 370/252
See application file for complete search history.

(56) References Cited

U.S. PATENT DOCUMENTS

| | | | |
|---|---|---|---|
| 6,445,917 B1 * | 9/2002 | Bark et al. ..................... 455/423 |
| 8,045,996 B2 * | 10/2011 | Brunner et al. ............ 455/456.1 |
| 8,295,240 B2 * | 10/2012 | Suzuki et al. ................. 370/329 |
| 8,391,190 B2 * | 3/2013 | Pan et al. ...................... 370/280 |
| 8,406,790 B2 * | 3/2013 | Kazmi et al. .............. 455/456.1 |
| 8,478,200 B2 * | 7/2013 | Kim et al. .................... 455/67.11 |
| 2008/0062913 A1 * | 3/2008 | Zander et al. ................. 370/320 |
| 2009/0036116 A1 * | 2/2009 | Kim et al. ..................... 455/423 |
| 2009/0196197 A1 * | 8/2009 | DiGirolamo et al. ......... 370/252 |
| 2010/0190488 A1 * | 7/2010 | Jung et al. ..................... 455/424 |
| 2010/0322169 A1 * | 12/2010 | Narasimha .................... 370/329 |
| 2010/0330921 A1 * | 12/2010 | Kim et al. .................. 455/67.11 |
| 2011/0183661 A1 * | 7/2011 | Yi et al. ..................... 455/422.1 |
| 2011/0194441 A1 * | 8/2011 | Jung et al. ..................... 370/252 |
| 2011/0292852 A1 * | 12/2011 | Kone ............................ 370/311 |
| 2012/0015657 A1 * | 1/2012 | Comsa et al. ................. 455/436 |
| 2012/0106370 A1 * | 5/2012 | Radulescu et al. ............ 370/252 |
| 2012/0182879 A1 * | 7/2012 | Tamura et al. ................ 370/242 |
| 2012/0230205 A1 * | 9/2012 | An et al. ....................... 370/242 |
| 2012/0294169 A1 * | 11/2012 | Chui et al. .................... 370/252 |
| 2012/0322386 A1 * | 12/2012 | Yi et al. ..................... 455/67.11 |
| 2013/0016614 A1 * | 1/2013 | Suzuki et al. ................. 370/241 |
| 2013/0028126 A1 * | 1/2013 | Kazmi .......................... 370/252 |
| 2013/0045735 A1 * | 2/2013 | Kim et al. .................. 455/422.1 |
| 2013/0077519 A1 * | 3/2013 | Van Lieshout et al. ....... 370/252 |
| 2013/0121204 A1 * | 5/2013 | Lee et al. ...................... 370/252 |
| 2013/0148530 A1 * | 6/2013 | Di Girolamo et al. ........ 370/252 |

* cited by examiner

*Primary Examiner* — Ian N Moore
*Assistant Examiner* — Lakeram Jangbahadur
(74) *Attorney, Agent, or Firm* — Jefferson IP Law, LLP

(57) ABSTRACT

An apparatus and method for matching the radio channel measurement timing of Minimization of Drive Test (MDT) cycle with timings of the Discontinuous Reception (DRX) cycle are provided. The radio channel measurement method of a terminal according to the present invention includes configuring a DRX cycle, receiving a Minimization of Drive Test (MDT) cycle, comparing the DRX cycle and the MDT cycle, measuring, when the MDT cycle is an integer multiple of the DRX cycle, the radio channel at DRX timings matching with MDT timings, and storing a result of the measurement.

18 Claims, 13 Drawing Sheets

DEVICE AND METHOD FOR CONTROLLING DRIVE TEST IN WIRELESS COMMUNICATION SYSTEM

PRIORITY

This application claims the benefit under 35 U.S.C. §119(a) of a Korean patent application filed on Aug. 20, 2010 in the Korean Intellectual Property Office and assigned Serial No. 10-2010-0080946, the entire disclosure of which is hereby incorporated by reference.

BACKGROUND OF THE INVENTION

1. Field of the Invention

The present invention relates to a Minimization of Drive Test (MDT) measurement device and method. More particularly, the present invention relates to a device and method for determining a measurement cycle of a radio channel measurement cycle for collecting radio channel information to be used for optimization of a service area for a terminal operating in standby mode.

2. Description of the Related Art

Typically, mobile communications have been developed for the user to communicate while moving. With the rapid advance of technologies, the mobile communication system has evolved to a level capable of providing a high speed data communication service as well as a voice communication service. Recently, the 3$^{rd}$ Generation Partnership Project (3GPP), as one of the next generation mobile communication standardization organizations, is in the progress of standardization of Long Term Evolution-Advanced (LTE-A). LTE-A is a high speed packet-based communication technology supporting a data rate higher than that of the current mobile communication technology under the objective to complete the standardization in late 2010.

With the evolvement of the 3GPP standard, many discussions are being conducted for optimizing a radio network in addition to the effort for increasing the data rate. In the initial radio network configuration or optimization stage, a base station or a base station controller should collect radio environment information related to its own cell coverage. This process is called Drive Test. The conventional drive test is performed in such a way that an operator carries a test apparatus on a vehicle while performing the measuring task repeatedly for a long time. The measurement result is used to configure the system parameters of the base stations or base station controllers. Such a conventional drive test increases total costs and time for optimizing and maintaining the radio networks.

In order to improve the radio environment analysis and manual configuration process while minimizing the number of times of the drive test, research is being conducted under the title of Minimization of Drive Test (MDT). MDT is characterized in that the terminal transfers the radio channel measurement information to the base station periodically or in response to a specific event. The operation of the terminal transmitting the measured radio channel information and other supplementary information to the base station is referred to as MDT measurement information report hereinafter. The terminal transmits the channel measurement result immediately when it can communicate with the base station or, if the communication with the base station is unavailable, retains the MDT measurement information for transmission when it becomes possible to communicate with the base station afterward. The base station uses the MDT measurement information received from the terminal for optimization of the cell region. In LTE-A, the MDT measurement information reports are classified according to User Equipment (UE) Radio Resource Control (RRC) state as shown in Table 1.

TABLE 1

| RRC state of UE | MDT measurement information report operation |
|---|---|
| Idle mode | Logging and deferred reporting |
| Connected mode | Immediate reporting |

In Table 1, if the UE is in the state of having no communication with an evolved Node B (eNB), this means that the UE is in idle mode. Otherwise, if the UE is in the state of having communication with the eNB, this means that the UE is in connected mode. In case of MDT, since the channel information measured by the UE is transmitted by RRC signaling, the UE in idle mode does not transition to the connected mode for the information transmission. Accordingly, the transmission of the channel measurement information is deferred until the UE transitions to the connected mode. The UE collects the radio channel information at an MDT measurement interval in the connected mode or the idle mode. In order to measure the radio channel in idle mode, the UE has to turn on its receiver, resulting in power consumption. Accordingly, it is preferred to perform the MDT measurement and MDT report efficiently while minimizing the power consumption of the UE.

SUMMARY OF THE INVENTION

Aspects of the present invention are to address at least the above-mentioned problems and/or disadvantages and to provide at least the advantages described below. Accordingly, an aspect of the present invention is to provide a method for performing Minimization of Drive Test (MDT) measurement efficiently in a mobile communication system. Accordingly, an aspect of the present invention is to provide a device and method for synchronizing the radio channel measurement interval with a Discontinuous Reception (DRX) cycle, especially when the User Equipment (UE), in idle mode, measures the radio channel for collecting radio channel information to be used in service coverage optimization.

In accordance with an aspect of the present invention, a method for a terminal to measure a radio channel in a mobile communication system is provided. The method includes configuring a DRX cycle, receiving an MDT cycle, comparing the DRX cycle and the MDT cycle, measuring, when the MDT cycle is an integer multiple of the DRX cycle, the radio channel at DRX timings matching with MDT timings, and storing a result of the measurement.

In an exemplary implementation, an MDT server selects the terminal to perform MDT, determines the DRX cycle of the terminal, and sets the MDT cycle to an integer multiple of the DRX cycle.

In an exemplary implementation, the terminal measures, when the MDT cycle is not an integer multiple of the DRX cycle, the radio channel at MDT timings matching with DRX timings and stores a result of the measurement and, at MDT timings mismatching with DRX timings, skips measurement of the radio channel or records a last measurement result.

In an exemplary implementation, the terminal requests, when the MDT cycle is not an integer multiple of the DRX cycle, a base station to reset the MDT cycle to an integer multiple of the DRX cycle and receives the MDT cycle reset to the integer multiple of the DRX cycle.

In an exemplary implementation, the MDT server sets the MDT cycle to an integer multiple of a maximum DRX cycle and notifies the terminal of the MDT cycle.

In accordance with another aspect of the present invention, a method for performing Minimization of Drive Text (MDT) in a mobile communication system is provided. The method includes setting, between a User Equipment (UE) and a base station, a DRX cycle based on a UE-specific DRX cycle and a cell-specific DRX cycle, selecting, at an MDT server, the UE to measure a radio channel, requesting, at the MDT server, a Mobility Management Entity (MME) for the DRX cycle of the UE, determining an integer multiple of the DRX cycle received from the MME, transmitting the integer multiple to the UE as the MDT cycle, and measuring, at the UE, the radio channel and storing a result of the measurement at MDT timings matching with DRX timings.

In accordance with another aspect of the present invention, an apparatus for measuring a radio channel in a mobile communication system is provided. The apparatus includes a receiver for receiving a DRX cycle, a controller including a cycle comparer for comparing the DRX cycle and a Minimization of Drive Text (MDT) cycle and an analysis/indication module for controlling, when the MDT cycle is an integer multiple of the DRX cycle, to measure the radio channel at DRX timings matching with MDT timings, an MDT measurer measuring the radio channel under the control of the controller, and a buffer buffering measurement of the radio channel.

In an exemplary implementation, the mobile communication system includes an MDT server for selecting a terminal to perform MDT, for requesting the base station for the DRX cycle of the selected terminal, for selecting an integer multiple of the DRX cycle as the MDT cycle, and for transmitting the MDT cycle to the terminal.

In an exemplary implementation, the controller measures, when the MDT cycle is not an integer multiple of the DRX cycle, the radio channel at MDT timings matching with DRX timings and stores measurement result and, at MDT timings mismatching with DRX timings, skips measurement of the radio channel or records last measurement result without measuring the radio channel.

In an exemplary implementation, the controller requests, when the MDT cycle is not an integer multiple of the DRX cycle, a base station to reset the MDT cycle to an integer multiple of the DRX cycle and receives the MDT cycle reset to the integer multiple of the DRX cycle.

In an exemplary implementation, the mobile communication system includes an MDT server for setting, at an MDT server, the MDT cycle to an integer multiple of a maximum DRX cycle and for notifying the terminal of the MDT cycle.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
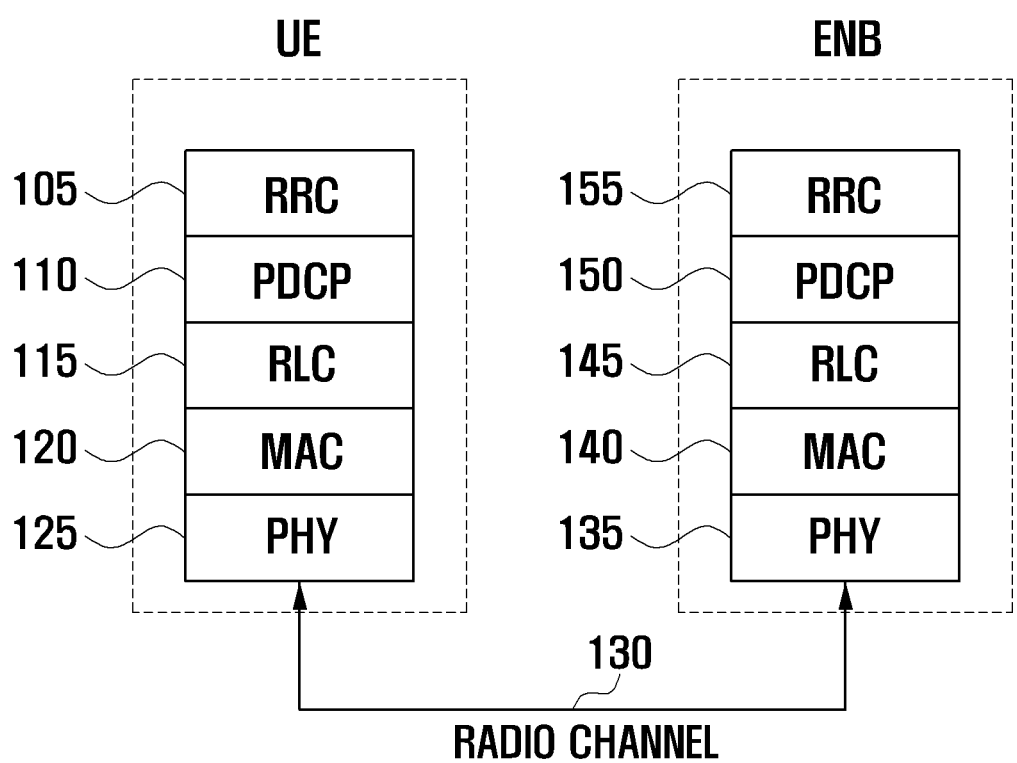
FIG. 1 is a diagram illustrating a standard control plane protocol stack in a Long Term Evolution (LTE) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a device and method for controlling a Minimization of Drive Test (MDT) measurement interval in a 3$^{rd}$ Generation Partnership Project (3GPP) system. More particularly, exemplary embodiments of the present invention provide a device and methods for synchronizing the radio channel measurement interval with a Discontinuous Reception (DRX) interval, especially when a User Equipment (UE) in idle mode measures the radio channel for collecting radio channel information to be used in service coverage optimization.

The UE collects the radio channel information at an MDT measurement interval while in connected mode or idle mode. Here, the radio channel information measurement can be periodical downlink pilot measurements. In order to collect the MDT measurement information in idle mode, the UE has to activate its receiver, resulting in power consumption. Accordingly, by performing the MDT measurement according to a DRX cycle, it is possible to reduce the power consumption. The UE activates its receiver during the DRX period to decode the downlink control channel. Accordingly, if the MDT measurement cycle is synchronized with the DRX cycle, it is possible to negate the power consumption for activating the receiver redundantly to perform the MDT measurement. In an exemplary embodiment of the present invention, the MDT measurement cycle is configured to match with the DRX cycle or is configured in consideration of the DRX cycle. The MDT measurement information is transmitted to the eNB using the control plane protocol stack for processing the Radio Resource Control (RRC) and Non-Access Stratum (NAS).

FIG. 1 is a diagram illustrating a standard control plane protocol stack in a Long Term Evolution (LTE) system according to an exemplary embodiment of the present invention.

Referring to FIG. 1, the RRC layer 105 and 155 is responsible for controlling transmission of system information, RRC connection setup, and channel measurement operations. The Packet Data Convergence Protocol (PDCP) layer 110 and 150 is responsible for IP header compression/decompression, and the Radio Link Control (RLC) layer 115 and 145 is responsible for segmenting the PDCP Protocol Data Unit (PDU) into segments in appropriate size for Automatic Repeat Request (ARQ) operation. The Media Access Control (MAC) layer 120 and 140 is responsible for establishing connection to a plurality of RLC entities so as to multiplex the RLC PDUs into MAC PDUs and demultiplex the MAC PDUs into RLC PDUs. Each protocol layer entity adds an appropriate header in need, i.e., the RLC layer 115 and 145 adds an RLC header having a sequence number to an RLC Service Data Units (SDU), and the MAC layer 120 and 140 adds a MAC header having the RLC identifier to the MAC SDU. The PHY layer 125 and 135 performs channel coding on the MAC PDU and modulates the MAC PDU into OFDM symbols to transmit over radio channel 130 or performs demodulating and channel-decoding on the received OFDM symbols and delivers the decoded data to the higher layer. The PHY layer is responsible for Hybrid Automatic Retransmission Request (HARQ) operation of MAC PDUs. HARQ is a technique for retransmission on the PHY layer and performing soft combining on the retransmitted packets and initially transmitted packets.

Figure 2:
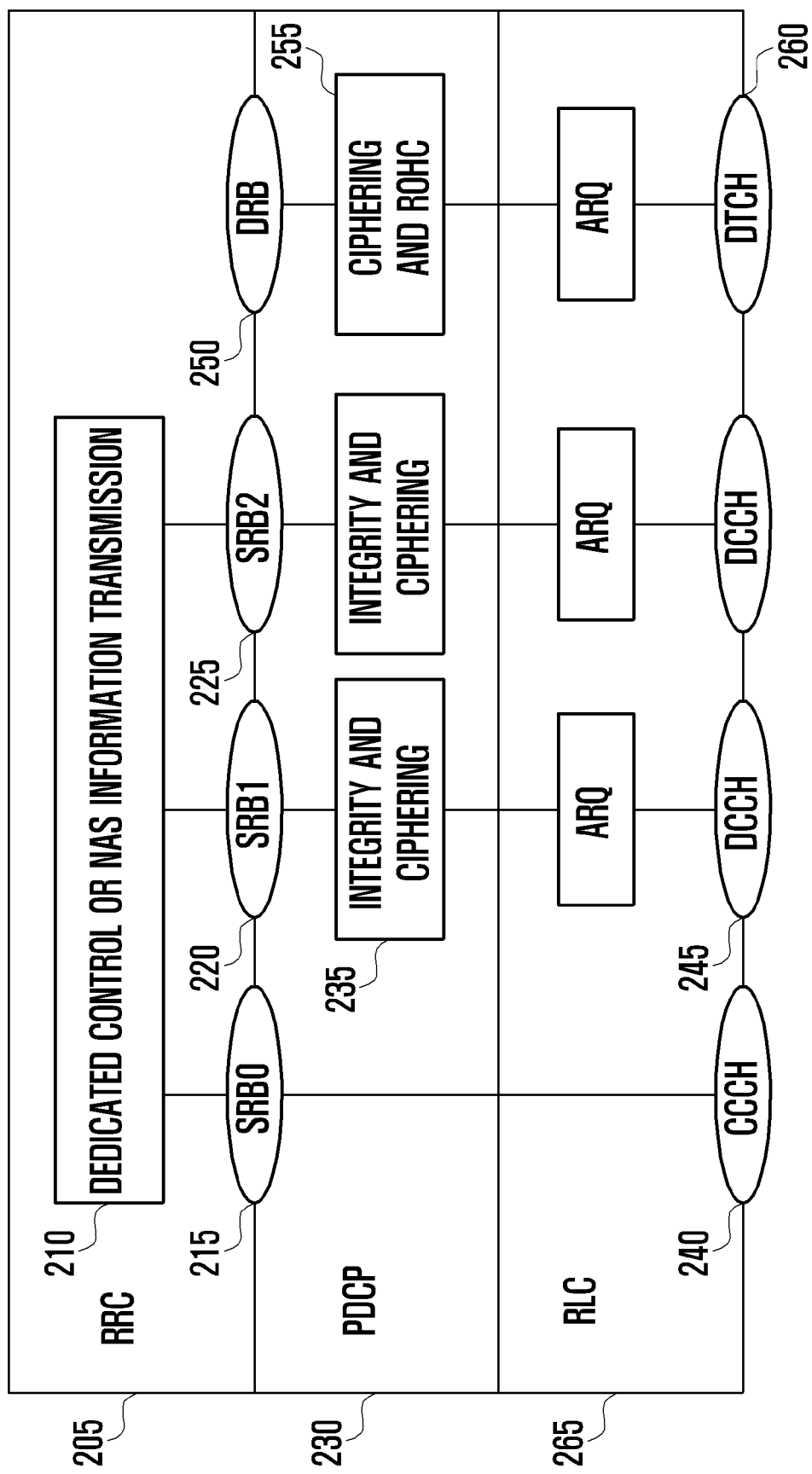
FIG. 2 is a diagram illustrating the concept of Signaling Radio Bearer (SRB) mapping in an LTE system according to an exemplary embodiment of the present invention.

FIG. 2 is a diagram illustrating the concept of Signaling Radio Bearer (SRB) mapping in an LTE system according to an exemplary embodiment of the present invention.

Referring to FIG. 2, the MDT measurement information recorded by the UE is delivered from the RRC layer 205 to the PDCP layer 230 via the Signaling Radio Bearer 2 (SRB2) 225. The RRC control message or NAS message (dedicated control or NAS information) 210 is delivered via SRB0 215, SRB1 220, or SRB2 225. SRB0 is used for delivering an RRC message to be transmitted through a Common Control Channel (CCCH) 240 and assigned the highest priority. SRB 1 220 is used to deliver the RRC message to be transmitted through a Dedicated Control Channel (DCCH) 245 and the NAS message is transmitted as piggybacked partially. SRB2 225 is used to deliver the NAS message through DCCH. The packets transmitted over the SRB1 220 and SRB2 225 are encoded through the integrity and ciphering process 235. SRB1 220 has a higher priority than that of SRB2 225. The MDT measurement information is transmitted over SRB2 225 having the lowest priority. In addition to SRB0 215 to SRB2 225, there exists Data Radio Bearer (DRB) 250 for use in user plane data transmission. The packet to be transmitted over DRB 250 is delivered to the RLC layer 265 through a ciphering and Robust Header Compression (ROHC) process 255, and the RLC layer 265 maps the packet to Dedicated Traffic Channel (DTCH) 260.

The UE in standby mode records the MDT measurement information periodically or when the measurement information fulfills a condition to trigger the MDT measurement information recording. The MDT measurement information recording events are as follows:

1. Periodical downlink pilot measurements
2. Serving cell becomes worse than threshold
3. Transmit power headroom becomes less than threshold The periodical downlink pilot measurement is performed in order for the UE to measure and collect information for optimizing the service area periodically in the connected mode or the standby mode. The measurement is performed at an MDT measurement interval, and the eNB notifies the UE of the MDT configuration. In case that specific conditions are fulfilled, i.e. if the measured signal strength of the serving cell is equal to or less than the threshold value or if the transmit power headroom is equal to or less than the threshold value, the UE measures and collects the information necessary for the optimization of the service area. The MDT measure information recorded for service area optimization includes the following:

1. Global cell ID of a serving cell
2. Reference Signal Receive Power (RSRP) and Reference Signal Receive Quality (RSRQ) measurement results of serving cell
3. Location information
4. Time stamp The MDT measurement information should basically include the global cell ID of the serving cell. This informs of the cell from which the information is collected. The global cell ID is the unique information identifying the cell. The radio channel condition of the serving cell (measurement results) can be expressed by a specific parameter. The parameter can be RSRP or RSRQ in Evolved Universal Terrestrial Radio Access (EUTRA), Received Signal Code Power (RSCP) Ec/No in Evolved Universal Mobile Telecommunications System (UMTS) Terrestrial Radio Access Network (UTRAN), and Receive (Rx) level in Global System for Mobile Communications (GSM)/Edge Radio Access Network (GERAN). Although the description is directed to an EUTRA LTE system, exemplary embodiments of the present invention can be applied to other types of systems. In 3GPP, the MDT function is expected to be applied to LTE and UMTS.

The location information (location info.) among the MDT measurement transmitted to the eNB is an important factor. In case that it fails to acquire the location information based on a Global Positioning System (GPS), a set of the received signal strengths measured by the adjacent eNBs, and the set of the received signal strengths is referred to as a Radio Frequency (RF) fingerprint. The eNB that received the RF fingerprint is aware of the locations of the neighbor eNBs and can estimate the distances between the UE and neighbor cells with the signal strength values of the neighbor cells using the signal propagation attenuation model. It is possible to locate the UE approximately using the triangulation method with the location information of the neighbor eNBs and distances between the UE and the neighbor cells. In case that the GPS-based location information acquisition is impossible, it is possible to transmit the information on the location estimated using the RF fingerprint to the eNB although it is not exact location information.

The time stamp is also important in the MDT measurement information. The time information is important for measuring the radio channel to optimize the service area. This is because the radio channel condition is time-varying. The time stamp is used effectively for reporting the measurement information recorded in standby mode rather than reporting the measurement information immediately in connected mode. Since the measurement result is reported right after the measurement has completed in the connected mode, the time stamp is not so important. In the standby mode, however, if no timestamp is used, it is impossible to determine the time when the measurement has been performed. Accordingly, in the 3GPP standard under development, the time stamp is defined as mandatory information for the measurement report in standby mode although not used in the immediate report.

The time stamp can be set to a value using different types. That is, the UE can set the time stamp to an absolute value or a relative value. The absolute value type requires a large number of bits to provide the time information. In contrast, the relative value type requires a small number of bits to provide the time information as compared to the absolute value type. In order to reduce signaling overhead, the relative value type is used for the MDT measure information in the 3GPP standard. The eNB notifies the UE of the absolute time reference information, and the UE inserts the relative time stamp into each measurement sample by referencing the absolute time. When reporting the measurement result to the eNB, the UE notifies of the absolute time provided by the eNB previously too. This is because the eNB which has provided the initial absolute time reference information may differ from the eNB to which the UE is reporting currently.

Figure 3:
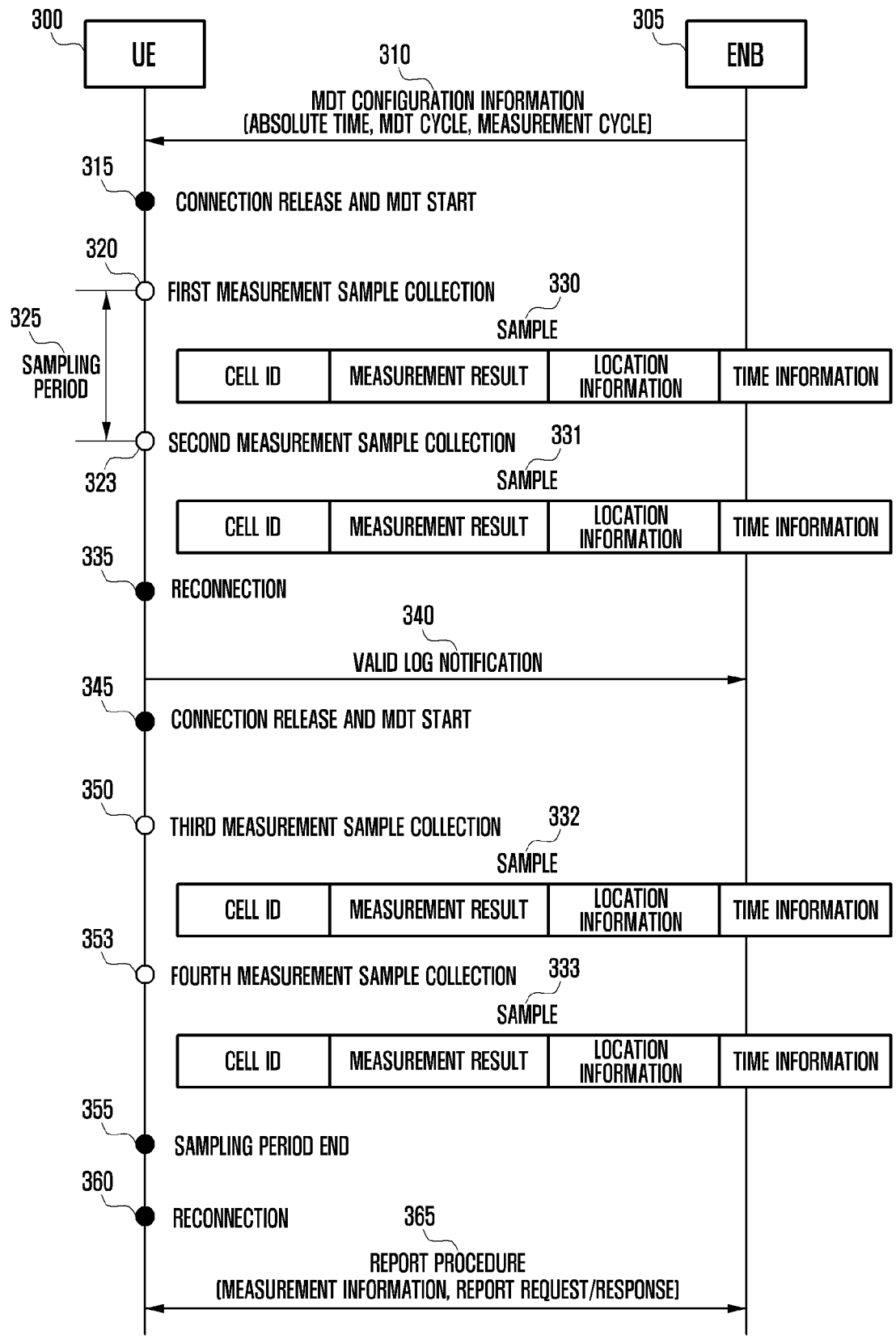
FIG. 3 is a signaling diagram illustrating a Minimization of Drive Test (MDT) measurement for record and report procedure in standby mode according to an exemplary embodiment of the present invention.

FIG. 3 is a signaling diagram illustrating an MDT measurement for record and report procedure in standby mode according to an exemplary embodiment of the present invention. In the exemplary embodiment of FIG. 3, it is assumed that the UE performs an MDT measurement and recoding operation for measurement duration at an MDT sampling cycle and reports the measurement result to the eNB at two MDT sampling cycles.

Referring to FIG. 3, the eNB 305 transmits the MDT measurement configuration information to the UE 300 in connected mode in step 310. The MDT measurement configuration information includes the absolute time information, MDT sampling cycle, and measurement duration. The absolute time information is set as described above. The MDT sampling cycle is used for periodic downlink pilot signal measurement such that the radio channel measurement is performed at the sampling cycle. The measurement duration is the total time for performing MDT. If the measurement duration expires, the UE stops MDT measurement.

If the RRC status of the UE transitions from the connected mode to the standby mode in step 315, the UE starts MDT measurement. Here, the UE collects and records the first MDT measurement sample in step 320. The MDT measurement and recording is performed at the MDT sampling cycle 325, notified at step 310, in steps 323, 350, and 353. The UE performs the MDT measurement recording for every measurement sample, and the aforementioned MDT measurement information is recorded as denoted by reference numbers 330 to 333. The logged samples 330 to 333 can include the aforementioned information, i.e. global cell ID, measurement results, location information, and time stamp. Once the UE re-enters the connected mode (connection recovery) at step 335, the UE notifies the eNB whether there are available recorded MDT measurement (indication whether or not there are available logs) in step 340. The eNB can request for the measurement report. Upon receipt of the measurement report request, the UE reports the recorded MDT measurement and deletes the recorded information. The recorded information is retained until the measurement report request.

The UE enters the standby mode again in step 345 and, if the measurement duration is not expired yet, continues MDT measurement (connection release and MDT start) to collect the MDT measurement information (measurement sample taken) in step 350. The measurement duration can be set with or without consideration of the time in the connected mode. If the MDT measurement duration expires, the UE terminates MDT measurement in step 355. After terminating the MDT measurement, the UE re-enters the connected mode (connection recovery) in step 360, and, in step 365, notifies the eNB of the MDT measurement information to be reported, and reports, if there is the measurement report request from the eNB, the measurement result.

In case that the UE performs the MDT measurement and report of radio channel information to be used for service area optimization periodically in the standby mode, it is preferred to synchronize the MDT sampling cycle with the DRX cycle. Discontinuous Reception is capable of reducing power consumption caused by continuous monitoring on the downlink control channel. DRX can be applied in both the connected and standby modes and determines the time of paging to the UE. The eNB pages the UE periodically and thus the UE senses the paging signal on the downlink control channel. Hereinafter, this interval is referred to as DRX cycle.

Figure 4:
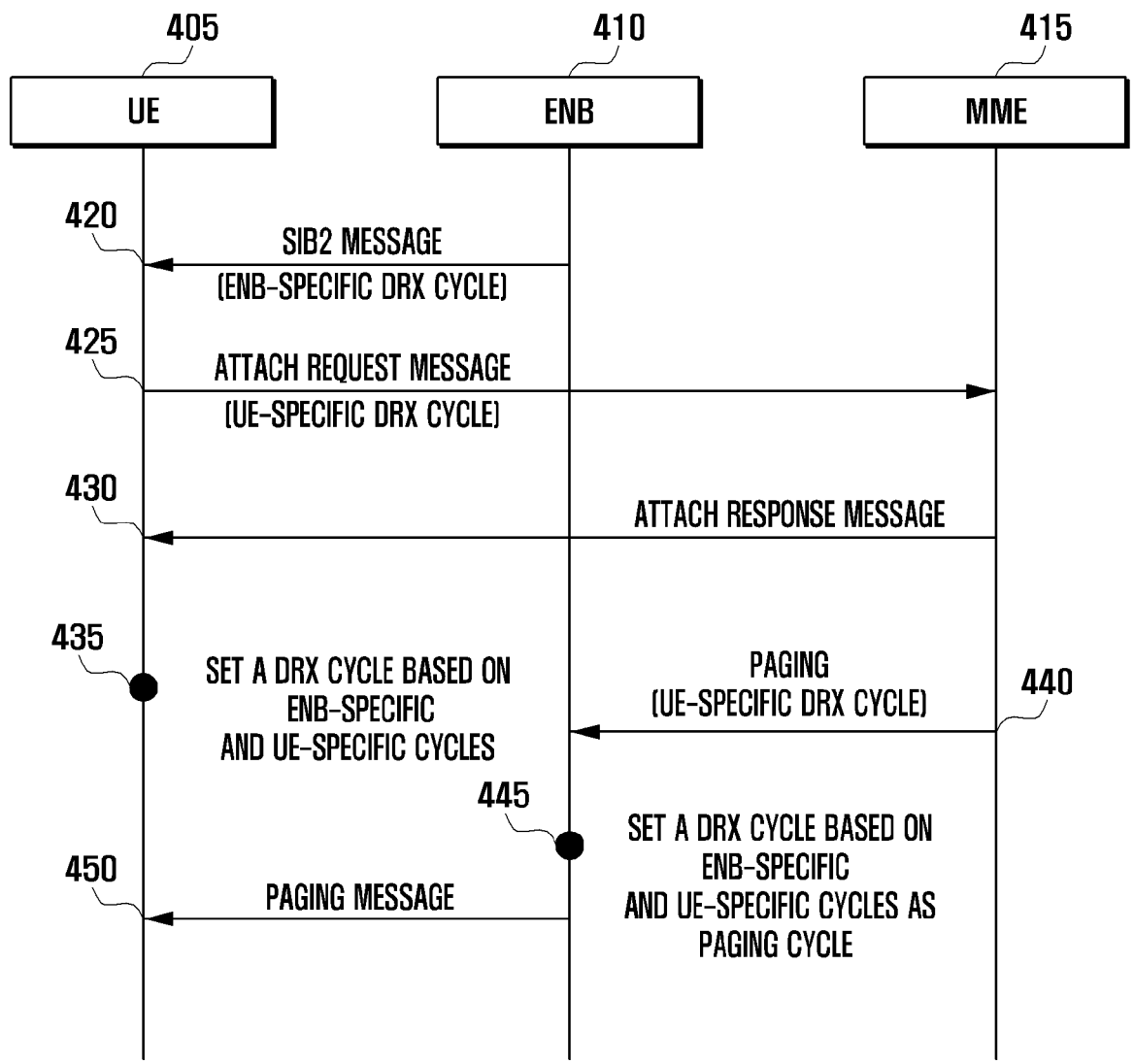
FIG. 4 is a signaling diagram illustrating a procedure for determining a Discontinuous Reception (DRX) cycle in an MDT method according to an exemplary embodiment of the present invention.

FIG. 4 is a signaling diagram illustrating a procedure for determining a DRX cycle in an MDT method according to an exemplary embodiment of the present invention.

Referring to FIG. 4, the UE 405 receives the SIB2 as the system information message broadcast by the eNB 410 in step 420. The SIB2 includes the default paging cycle information indicating the cell-specific DRX cycle. The default paging cycle can be set to a value indicating one of 32, 64, 128, and 256 frames. Here, a frame has the length of 10 ms and thus, if the paging cycle is 32 frames, this means that the DRX cycle is 32 ms. The eNB 405 transmits an attach request message to the Mobility Management Entity (MME) 415 in the initial UE registration process in step 425. The attach request message includes the UE-specific DRX cycle. The specific DRX cycle also has a value of one of 32, 64, 128, and 256 frames. The MME 415 transmits an attach response message to notify the UE of the completion of the UE registration in step 430.

The UE 405 compares the default paging cycle value (cell-specific value) provided by the eNB 410 with the UE-recommended DRX (UE-specific value) to determine the smallest one of the cell-specific and UE-specific values as the DRX cycle in step 435. At this time, the MME 415 delivers the DRX cycle received from the UE to the eNB 410 in step 440. Upon receipt of the DRX cycle, the eNB 410 compares the default paging cycle value (cell-specific) with the UE-recommended DRX value (UE-specific) to determine one of the cell-specific and UE-specific values as the DRX cycle in step 445. If it is necessary to page the UE 405, the eNB 410 transmits the paging message at the determined DRX cycle in step 450. The UE 405 performs monitoring on the Physical Downlink Control Channel (PDCCH) to detect the paging message transmitted by the eNB 410 and, if received, performs decoding on the paging message.

Here, the DRX cycle may differ from the MDT sampling cycle. This is because the MDT sampling cycle is determined by the MDT server. If the MDT sampling cycle is equal to the DRX cycle or an integer multiple of the DRX cycle, the MDT sampling cycle can be used as it is. However, the MDT sampling cycle may be less than the DRX cycle or not an integer multiple of the DRX cycle. The reason why the DRX cycle and the MDT sampling cycle may not match with each other is because the DRX and MDT sampling cycles are determined by different entities.

Figure 5:
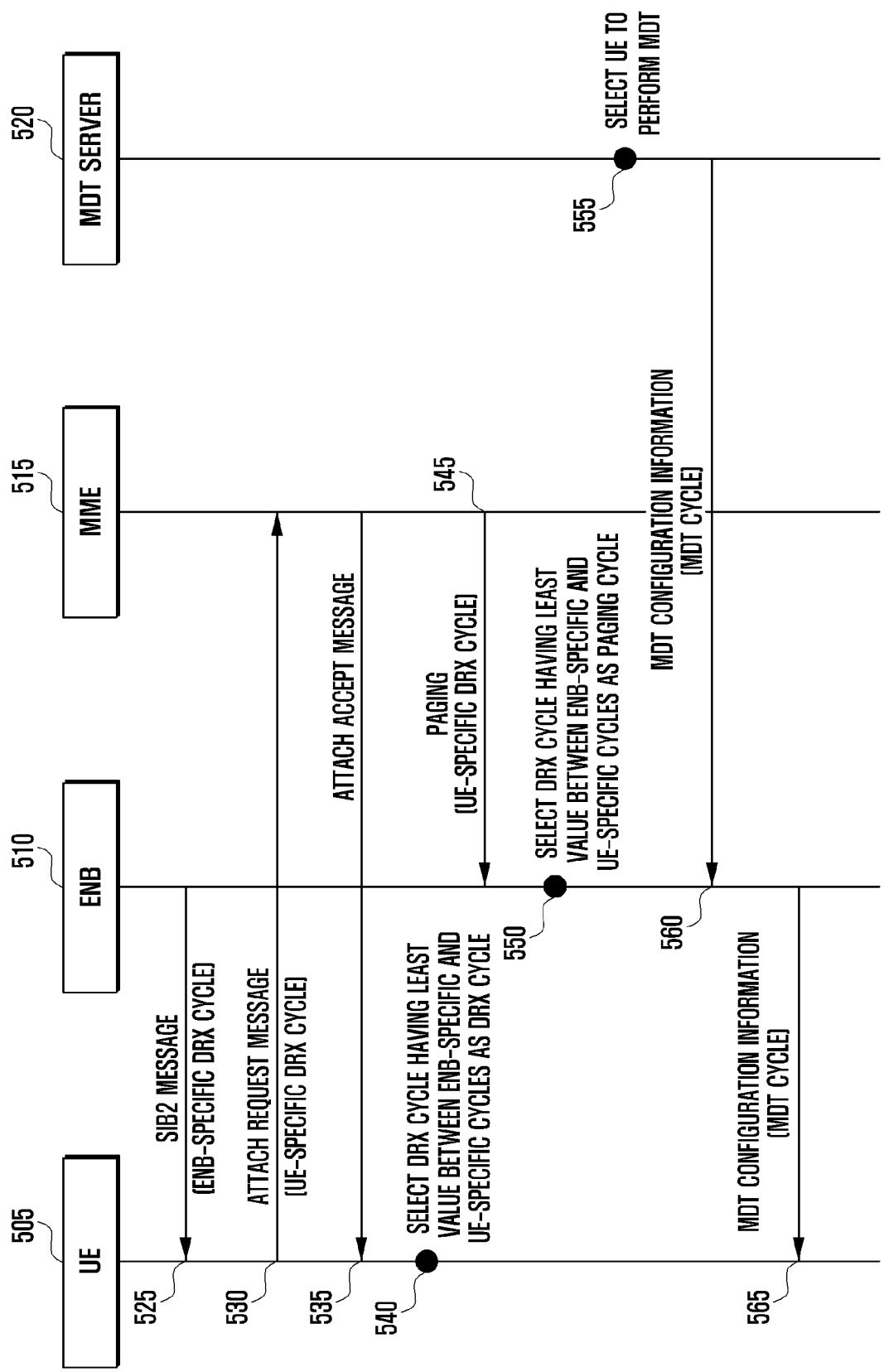
FIG. 5 is a signaling diagram illustrating a procedure for determining a DRX cycle and an MDT sampling cycle in an MDT method according to an exemplary embodiment of the present invention.

FIG. 5 is a signaling diagram illustrating a procedure for determining a DRX cycle and an MDT sampling cycle in an MDT method according to an exemplary embodiment of the present invention.

Referring to FIG. 5, the DRX cycle is determined with the involvement of the UE 505, the eNB 510, and the MME 515. However, the MDT sampling cycle is determined with the involvement of the UE 505, the eNB 510, and the MDT server 520. The process for determining the DRX cycle in steps 525 to 550 is identical with that of steps 420 to 445 of FIG. 4. That is, the UE 505 and eNB 510 compare the DRX cycles of the eNB 510 and UE 505 to determine the DRX cycle having the value less than the other.

In the MDT sampling cycle determination process, the MDT server 520 selects a UE to perform the MDT operation in step 555. The MDT server transmits the MDT configuration information including the MDT measurement information to the eNB 510 in step 560. Here, the MDT configuration information includes the MDT sampling period. The eNB delivers the MDT configuration information to the UE 505 to perform MDT operation in step 565. At this time, the MDT configuration can be generated by the eNB 510.

Comparing the DRX cycle determination process and the MDT sampling cycle determination process, it is noted that the two DRX and MDT sampling cycles are determined by different entities. In contrast to the DRX cycle which is determined by comparing the default paging cycle (or cell-specific DRX cycle) with the UE-recommended cycle (UE-specific cycle), the MDT sampling cycle is determined by the MDT server 520. Accordingly, it is unlikely that the MDT sampling cycle always matches with an integer multiple of the DRX cycle. For example, if the MDT sampling cycle is set to 64 while the DRX cycle is 128, the MDT measurement is performed at a timing different from the DRX timing. Accordingly when the MDT sampling cycle is less than the DRX cycle or not an integer multiple of the DRX cycle, it is necessary to synchronize the MDT sampling cycle with the DRX cycle. Descriptions are made of exemplary methods for synchronizing the MDT sampling cycle and the DRX cycle hereinafter.

First Exemplary Embodiment

In a method for determining the MDT sampling cycle according to a first exemplary embodiment of the present invention, the MDT server requests the MME for information on the DRX cycle of the UE for determining the MDT sampling cycle. The MDT server determines an integer multiple of the DRX cycle of the UE as the MDT sampling cycle.

Figure 6:
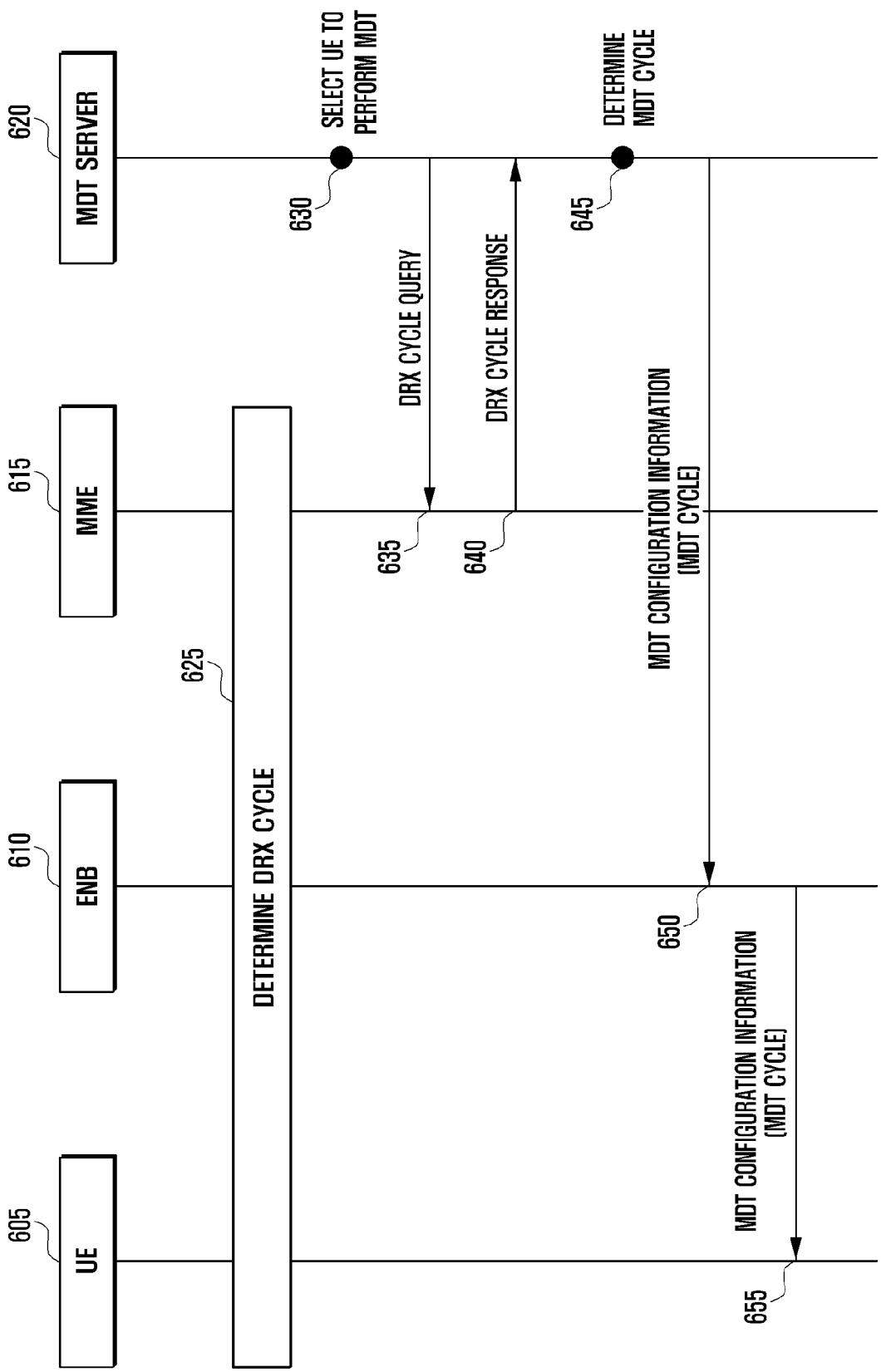
FIG. 6 is a signaling diagram illustrating a procedure for determining an MDT sampling cycle according to a first exemplary embodiment of the present invention.

FIG. 6 is a signaling diagram illustrating a procedure for determining an MDT sampling cycle according to a first exemplary embodiment of the present invention.

Referring to FIG. 6, a UE 605, an eNB 610, and an MME 615 determine the DRX cycle through the procedure of FIG. 4 in step 625. Afterward, the MDT server 620 selects the UE 605 to perform MDT in step 630. The MDT server 620 queries the MME 615 for the DRX cycle of the UE 605 in step 635. In response to the query, the MME 615 notifies the MDT server 620 of the DRX cycle of the UE 605 by transmitting a DRX cycle response message in step 640. Once the DRX cycle of the UE 605 is determined, the MDT server 620 determines an integer multiple of the DRX cycle as the MDT sampling cycle in step 645. That is, the MDT server 620 determines a value equal to the DRX cycle or an integer multiple of the DRX as the MDT sampling cycle. The MDT server 620 transmits the MDT configuration information including the MDT sampling cycle to the eNB 610 in step 650. The eNB 610 delivers the MDT configuration information to the UE 605 to perform MDT sampling in step 655.

Second Exemplary Embodiment

In a method for determining an MDT sampling cycle according to a second exemplary embodiment of the present invention, the UE adjusts the MDT sampling cycle to match with the DRX cycle. As the simplest approach, if the MDT sampling cycle is shorter than or incompatible with the DRX cycle as a result of the comparison between the DRX cycle and MDT sampling cycle, the UE skips MDT measurement or reuses the most recent measurement result at the timings when two cycles mismatch with each other. That is, when the MDT sampling cycle is shorter than or not equal to an integer multiple of the DRX cycle, the UE performs MDT measurement at the timings when the two cycles match with each other and skips MDT measurement or reuses the most recent measurement result at the timings when the two cycles mismatch with each other.

Figure 7:
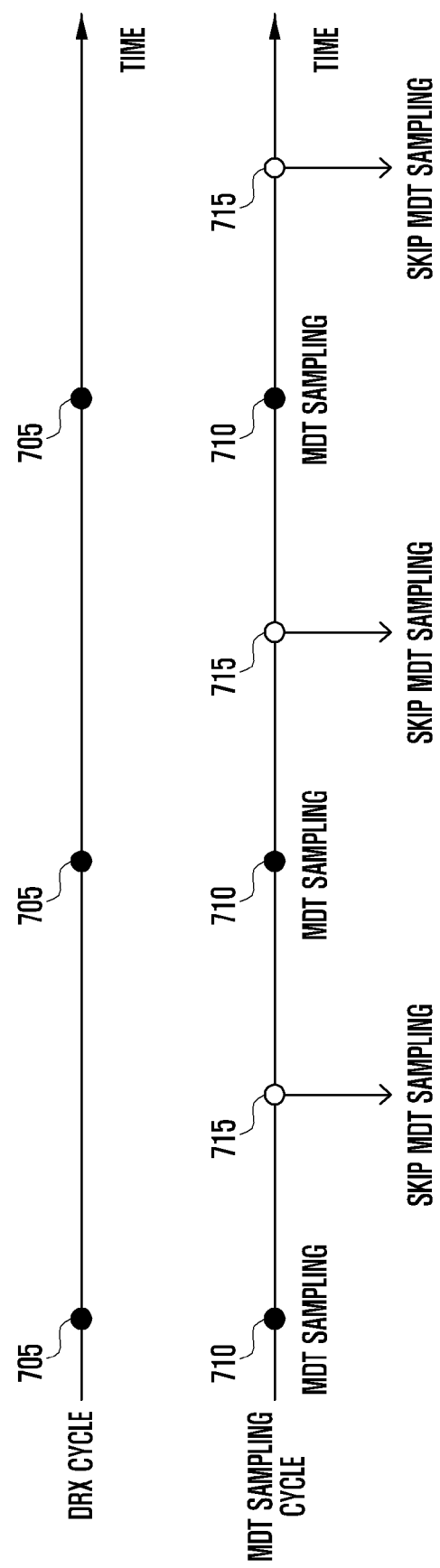
FIG. 7 is a diagram illustrating an MDT method for an exemplary situation where the DRX cycle and the MDT sampling cycle mismatch with each other according to a second exemplary embodiment of the present invention.

FIG. 7 is a diagram illustrating an MDT method for an exemplary situation where the DRX cycle and MDT sampling cycle mismatch with each other according to a second exemplary embodiment of the present invention.

Referring to FIG. 7, reference number 705 denotes the timings of a DRX cycle for the UE to sense the downlink control channel. Reference numbers 710 and 715 denote the timings of the MDT sampling cycle. As shown in FIG. 7, the MDT sampling cycle is shorter than the DRX cycle. Since the MDT sampling timings 710 match with the DRX timings 705, the UE performs MDT sampling at the timings 710. Meanwhile, the MDT sampling timings 715 mismatch with the DRX timings 705. In this case, the UE skips MDT sampling and saves no record even when the MDT sampling timing has arrived.

This approach can be applied to the case where the MDT sampling cycle is longer than or not compatible with the DRX cycle. For example, when the MDT sampling cycle is 1.5 times longer than the DRX cycle, the two cycles do not match completely with each other (i.e., not compatible with each other). In this case, the UE can perform and record the MDT sampling at the timings when the two cycles match with each other (at the timings of the 3 multiple cycle of the DRX cycle) and skip the MDT sampling at the other MDT sampling timings. The method proposed in FIG. 7 can be applied to cases where the MDT sampling cycle is shorter than the DRX cycle or the two cycles are not compatible with each other.

Figure 8:
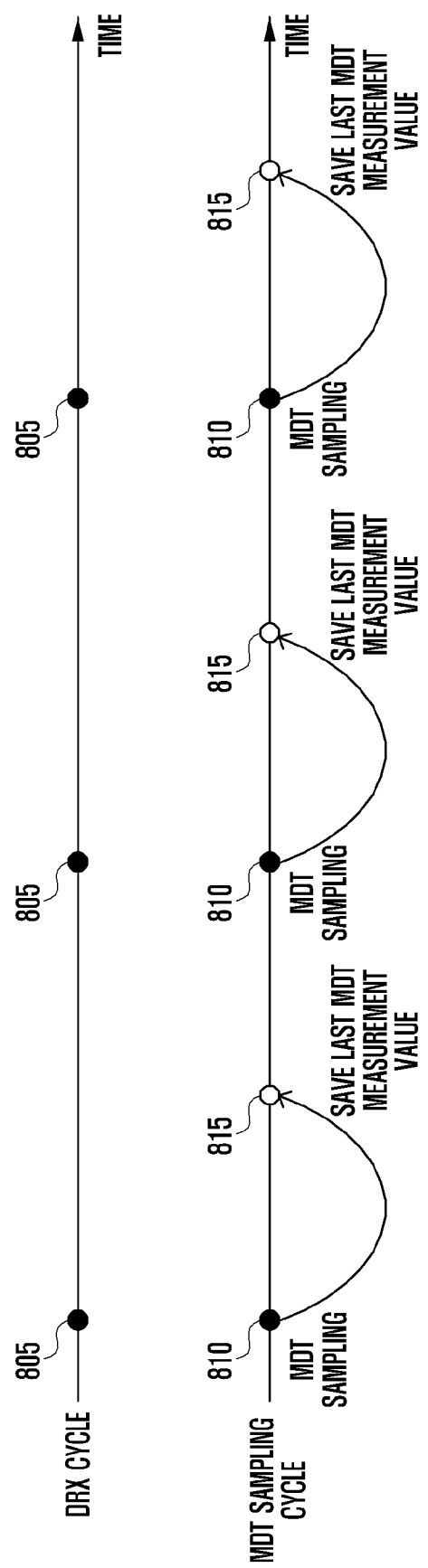
FIG. 8 is a diagram illustrating an MDT method for another exemplary situation where the DRX cycle and the MDT sampling cycle mismatch with each other according to the second exemplary embodiment of the present invention.

FIG. 8 is a diagram illustrating an MDT method for another exemplary situation where the DRX cycle and the MDT sampling cycle mismatch with each other according to the second exemplary embodiment of the present invention.

Referring to FIG. 8, the DRX cycle and the MDT sampling cycle are identical with those depicted in FIG. 7, and the MDT sampling timings 810 and 815 occur at a short interval as compared to the DRX timings 805. At the MDT sampling timings 810 that match with the DRX timings 805, the UE performs MDT measurement and records the measurement result. However, at the MDT sampling timings 815 when no DRX occurs, the UE skips MDT measurement operation. That is, even when the MDT sampling timing has arrived, the UE skips the MDT sampling. Unlike the method of FIG. 7, although not performing the MDT sampling, the UE records the most recent MDT measurement result at the MDT timings 815 mismatching with the DRX timings 810. Although there are redundant MDT measurement result recordings, the method of FIG. 8 is advantageous to maintain the MDT sampling cycle instructed by the eNB.

Similar to the method of FIG. 7, the MDT measurement and recording method described with reference to FIG. 8 can be applied to the situations when the MDT sampling cycle is longer than the DRX cycle or incompatible with the DRX cycle since the MDT sampling cycle is not an integer multiple of the DRX cycle.

In case that the MDT sampling is performed at a cycle different from the MDT sampling cycle notified by the MDT server as shown in FIGS. 7 and 8, the UE can report the actual MDT measurement cycle to the eNB or the MDT server.

Figure 9:
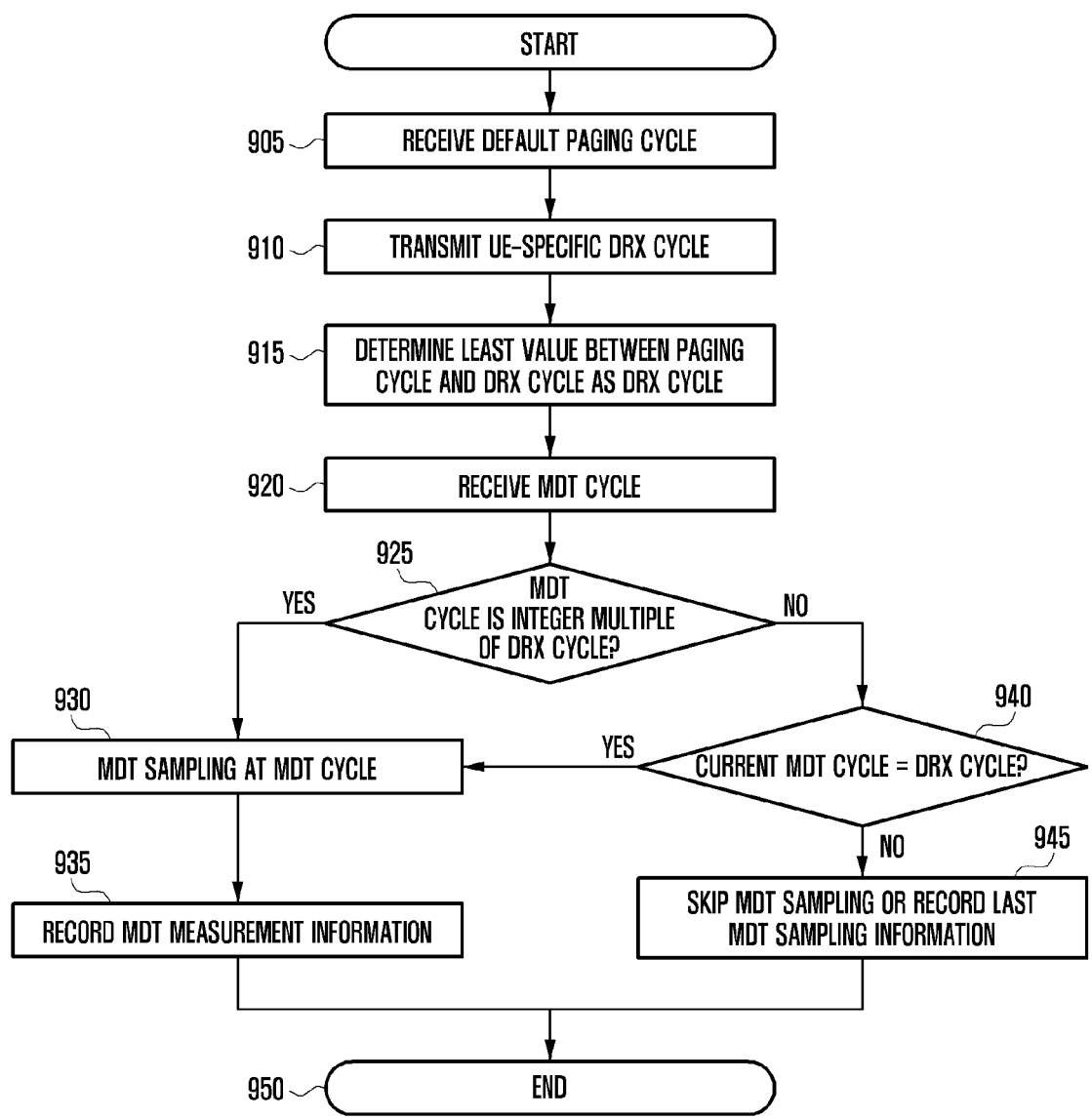
FIG. 9 is a flowchart illustrating an MDT measurement and recording procedure of a User Equipment (UE) in the MDT method according to the second exemplary embodiment of the present invention.

FIG. 9 is a flowchart illustrating an MDT measurement and recording procedure of a UE in the MDT method according to the second exemplary embodiment of the present invention.

Referring to FIG. 9, the UE receives a default paging cycle on SIB2 from the eNB in step 905. The UE sends an attach request message including a DRX cycle in step 910. The UE sets its DRX cycle to min [default paging cycle, UE-specific DRX cycle] in step 915. The UE receives the information necessary for the MDT measurement from the eNB in step 920. This information includes the MDT sampling cycle.

Once the DRX cycle and the MDT sampling cycle are determined, the UE determines whether the MDT sampling cycle is a multiple of the DRX cycle in step 925. If the MDT sampling cycle is equal to or a multiple of the DRX cycle, the UE performs MDT measurement in step 930 and records the MDT measurement result in step 935 at the MDT sampling cycle. If the MDT sampling cycle is equal to the DRX cycle, the UE performs the MDT measurement in synchronization with the DRX operation. And, if the MDT sampling cycle is twice longer than the DRX cycle, the UE performs the MDT measurement at every even numbered DRX timing (i.e., at an interval of every two DRX timings). If the MDT sampling timing arrives, the UE performs MDT measurement at step 930 and records the measurement results (logs the MDT measurement) at step 935.

Otherwise, if it is determined in step 925 that the MDT sampling cycle is not an integer multiple of the DRX cycle (i.e., the MDT sampling cycle is shorter than or not compatible with the DRX cycle), the UE determines whether the current MDT sampling timing matches with the DRX timing in step 940. If the current MDT sampling timing matches with the DRX timing, the UE performs MDT measurement at step 930 and records the measurement result at step 935. Otherwise, if the current sampling timing does not match with the DRX timing (i.e., if the MDT sampling timing is not identical with the DRX timing), the UE performs an MDT method according to one of the exemplary embodiments of FIGS. 7 and 8 in step 945. In case of using the method of FIG. 7, the UE skips the MDT measurement at the MDT timing. And, in case of using the method of FIG. 8, the UE stores the latest MDT measurement as the current MDT measurement at the MDT timing. After either step 935 or step 945, the UE performs step 950 by ending the exemplary procedure.

Third Exemplary Embodiment

In a method for determining the MDT sampling cycle according to a third exemplary embodiment of the present invention, the UE compares the MDT sampling cycle with the DRX cycle and reports, if the MDT sampling cycle is not an integer multiple of the DRX cycle (i.e., if the MDT sampling cycle is shorter than the DRX cycle or incompatible with the DRX cycle because it is not an integer multiple of, although longer than, the DRX cycle), an appropriate MDT sampling cycle is provided to the eNB so as to be assigned a new MDT sampling cycle.

Figure 10:
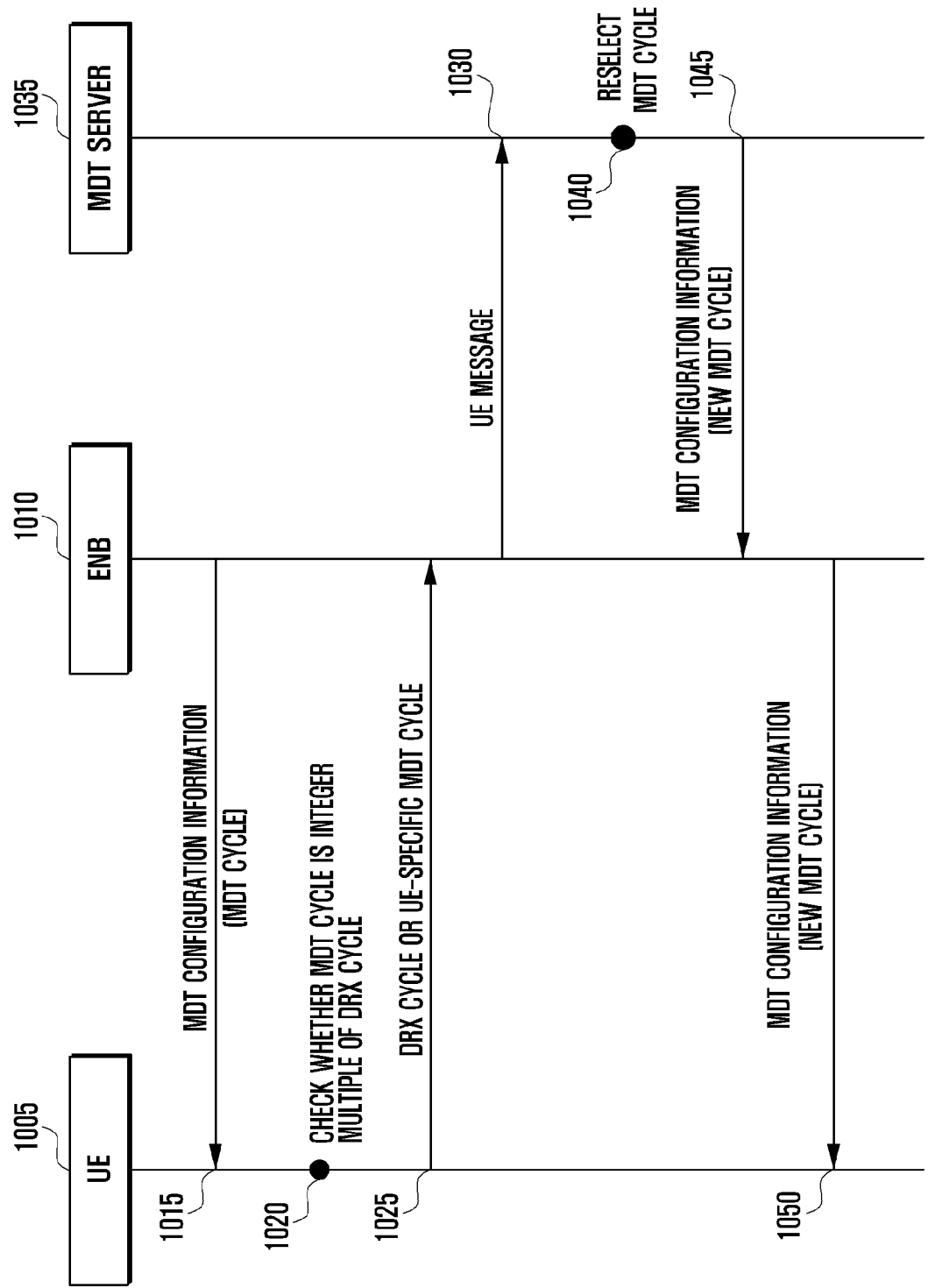
FIG. 10 is a signaling diagram illustrating a procedure for determining the MDT sampling cycle according to a third exemplary embodiment of the present invention.

FIG. 10 is a signaling diagram illustrating a procedure for determining an MDT sampling cycle according to a third exemplary embodiment of the present invention.

Referring to FIG. 10, the UE 1005 receives the MDT configuration information from the eNB 1010 in step 1015. The MDT configuration information includes the MDT sampling cycle. The UE 1005 compares the received MDT sampling cycle with the DRX cycle in step 1020. If the MDT sampling cycle is shorter than the DRX cycle or incompatible with the DRX cycle (i.e., MDT sampling cycle is not an integer multiple of the DRX cycle), the UE 1005 sends the eNB 1010 the DRX cycle or a recommended MDT sampling cycle in step 1025. If a message carrying the DRX cycle or the recommended MDT sampling cycle is received, the eNB 1010 forwards the message to the MDT server 1035 at step 1030. The MDT server 1035 reselects the MDT sampling cycle having an appropriated value based on the information contained in the received message at step 1040. The MDT server 1035 sends the MDT configuration information including the new MDT sampling cycle to the eNB 1010 at step 1045. The eNB 1010 forwards the MDT configuration information including the reselected MDT sampling cycle to the UE 1005 in step 1050.

FIG. 10 shows an exemplary case where the MDT server 1035 determines the MDT sampling cycle. In a scenario where the eNB 1010 generates the MDT configuration information, however, the eNB 1010 can determine or change the MDT sampling cycle. In this case, the eNB 1010 reselects the MDT sampling cycle based on the DRX cycle or the UE-recommended MDT sampling cycle received at step 1025 and informs the reselected MDT sampling cycle to UE 1005 and MDT server 1035.

Fourth Exemplary Embodiment

If the eNB or MDT server determining the MDT cycle needs the MDT measurement information recorded in a long period, it is possible to send the UE an MDT sampling cycle determined in advance to match with the DRX cycle. The DRX sampling cycle can be selected from a predefined set of values. In an exemplary case of the LTE standard, one of 32, 64, 128, and 256, which indicate a number frames, may be selected as the DRX cycle. If it is permitted to select the MDT sampling cycle longer than the longest DRX of 256 frames, the MDT sampling cycle can be set to a value matching with the DRX cycle primarily. That is, if the MDT sampling cycle is set to a multiple of the maximum DRX cycle, there is no possibility for the MDT sampling cycle to mismatch with the DRX cycle of the UE.

Figure 11:
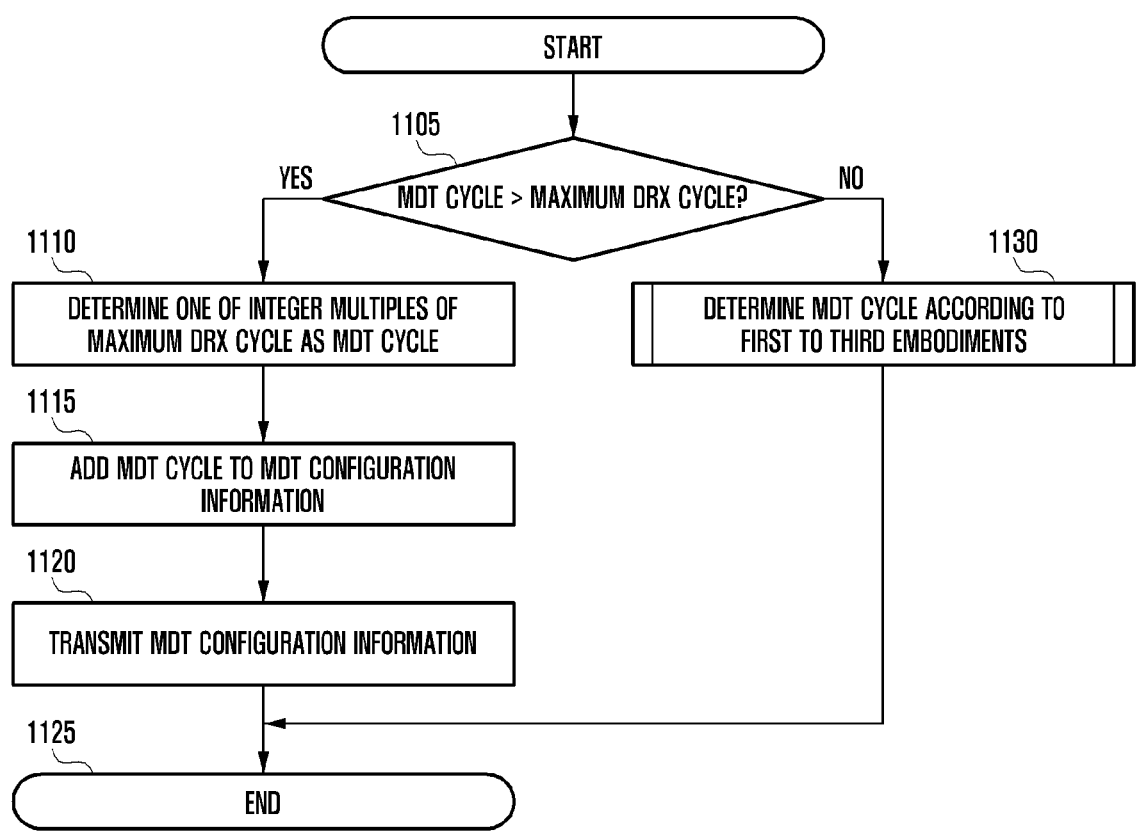
FIG. 11 is a flowchart illustrating a method for determining an MDT sampling cycle at an evolved Node B (eNB) or an MDT server according to a fourth exemplary embodiment of the present invention.

FIG. 11 is a flowchart illustrating a method for determining an MDT sampling cycle at an eNB or an MDT server according to a fourth exemplary embodiment of the present invention.

Referring to FIG. 11, the eNB or the MDT server determining the MDT sampling cycle determines whether the required MDT sampling cycle is longer than the maximum DRX cycle at step 1105. If the MDT sampling cycle is long than the maximum DRX cycle, the MDT server sets the MDT sampling cycle to a value among the multiples of the maximum DRX cycle at step 1110. The eNB or the MDT server includes the MDT sampling cycle in the MDT configuration information at step 1115 and sends the MDT configuration information to the UE at step 1120.

Otherwise, if it is determined that the required MDT sampling cycle is equal to or shorter than the maximum DRX cycle at step 1105, the eNB or the MDT server uses one of the above described methods (i.e., first to third exemplary embodiments) to determine the MDT sampling cycle at step 1130. After either step 1120 or step 1130, the eNB or the MDT server performs step 1125 by ending the exemplary procedure FIG. 12 is a block diagram illustrating a configuration of a UE according to an exemplary embodiment of the present invention.

Figure 12:
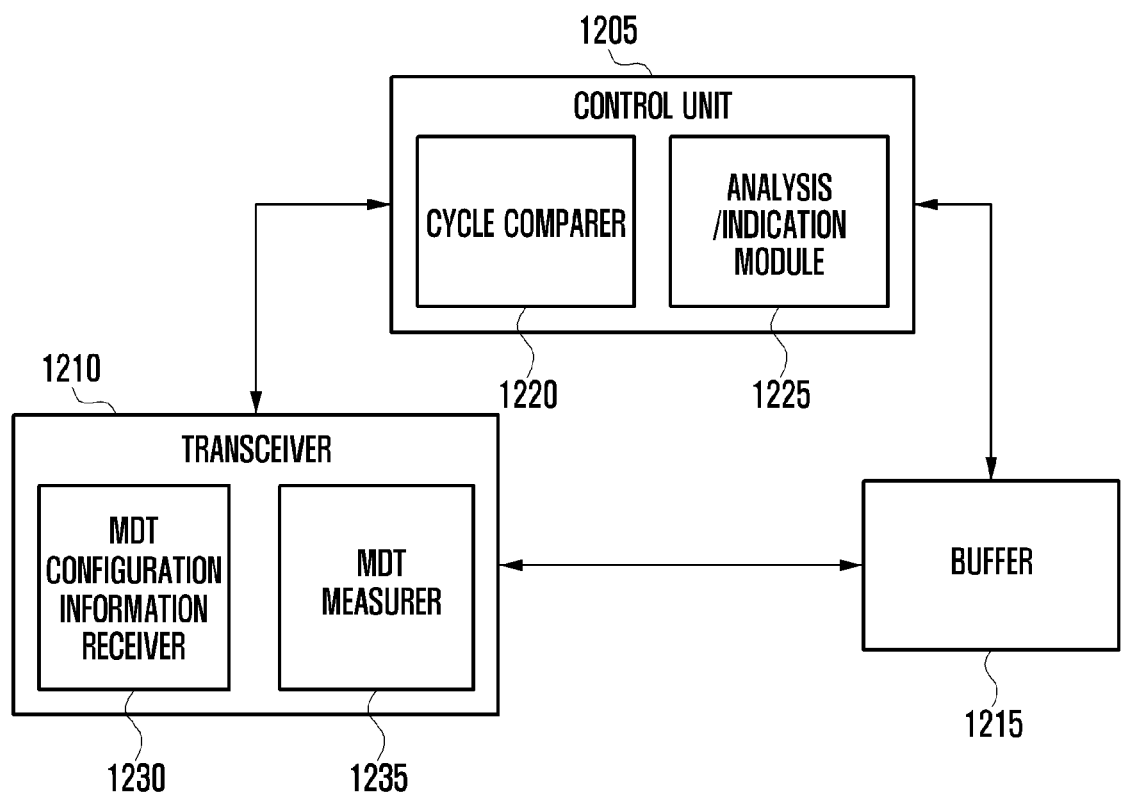
FIG. 12 is a block diagram illustrating a configuration of a UE according to an exemplary embodiment of the present invention.

Referring to FIG. 12, a control unit 1205 is responsible for comparing the MDT sampling cycle with the DRX cycle to adjust the MDT sampling cycle. The control unit 1205 includes a cycle comparer 1220 for comparing the DRX cycle and the MDT sampling cycle and an analysis/indication module 1225 for analyzing the comparison result. The cycle comparer 1220 compares the DRX cycle and the MDT sampling cycle with each other and sends the comparison result to the analysis/indication module 1225. In case that the DRX cycle and the MDT sampling cycle differ from each other, the analysis/indication module 1225 controls an MDT measurer 1235 of a transceiver 1210 and a buffer 1215 in order to adjust the MDT sampling cycle. In this manner, the analysis/indication module 1225 determines whether to perform the MDT measurement at the MDT measurement timing or requests the eNB for a new MDT sampling cycle. The transceiver 1210 includes an MDT configuration information receiver 1230 and the MDT measurer 1235. The MDT configuration information receiver 1230 receives the MDT configuration information from the eNB and forwards the MDT configuration information to the control unit 1205. The MDT measurer 1235 performs MDT measurement under the control of the control unit 1205. The buffer 1215 buffers the measurement result of MDT performed by transceiver 1210.

In the MDT measurement and recording procedure of the above-structured UE, the transceiver 1210 forwards the SIB2 message received from an eNB to the control unit 1205, and the control unit 1205 determines the default paging message or cell specific DRX cycle contained in the SIB2 message. The control unit 1205 sets the DRX cycle to a smallest value among the default paging cycle and the UE-recommended DRX cycle. The MDT configuration information receiver 1230 of the transceiver 1210 receives the MDT configuration information transmitted by the eNB and forwards the MDT configuration information to the control unit 1205. The MDT configuration information includes the MDT sampling cycle.

The cycle comparer 1220 compares the DRX cycle and the MDT sampling cycle with each other and sends the comparison result to the analysis/indication module 1225. The analysis/indication module 1225 analyzes the comparison result and controls the MDT measurement and recording based on the analysis result. The MDT measurement and recording can be performed using one of the methods proposed in the first to fourth exemplary embodiments. In case that the MDT sampling cycle can be equal to or a multiple of the DRX sampling cycle, the MDT measurer 1235 performs DRX and MDT measurement at an interval equal to or a multiple of the DRX cycle. Otherwise, if the MDT sampling cycle is not equal to or a multiple of the DRX sampling cycle (i.e., if the MDT sampling cycle is less than or incompatible with the DRX cycle), the analysis/indication module 1225 controls the MDT measurer 1235 of the transceiver 1210 to perform the MDT measurement according to one of the exemplary methods of FIGS. 7 and 8 and saves the measurement result in the buffer 1215. In case that the MDT sampling cycle is not a multiple of the DRX cycle (i.e., the MDT sampling cycle is less than or incompatible with the DRX cycle), the analysis/indication unit 1225 sends the UE's DRX cycle or the UE-recommended MDT sampling cycle to the eNB to receive a new MDT sampling cycle and control the MDT measurement and recording based on the new sampling cycle. At this time, the new MDT sampling cycle can be a multiple of the DRX cycle.

Figure 13:
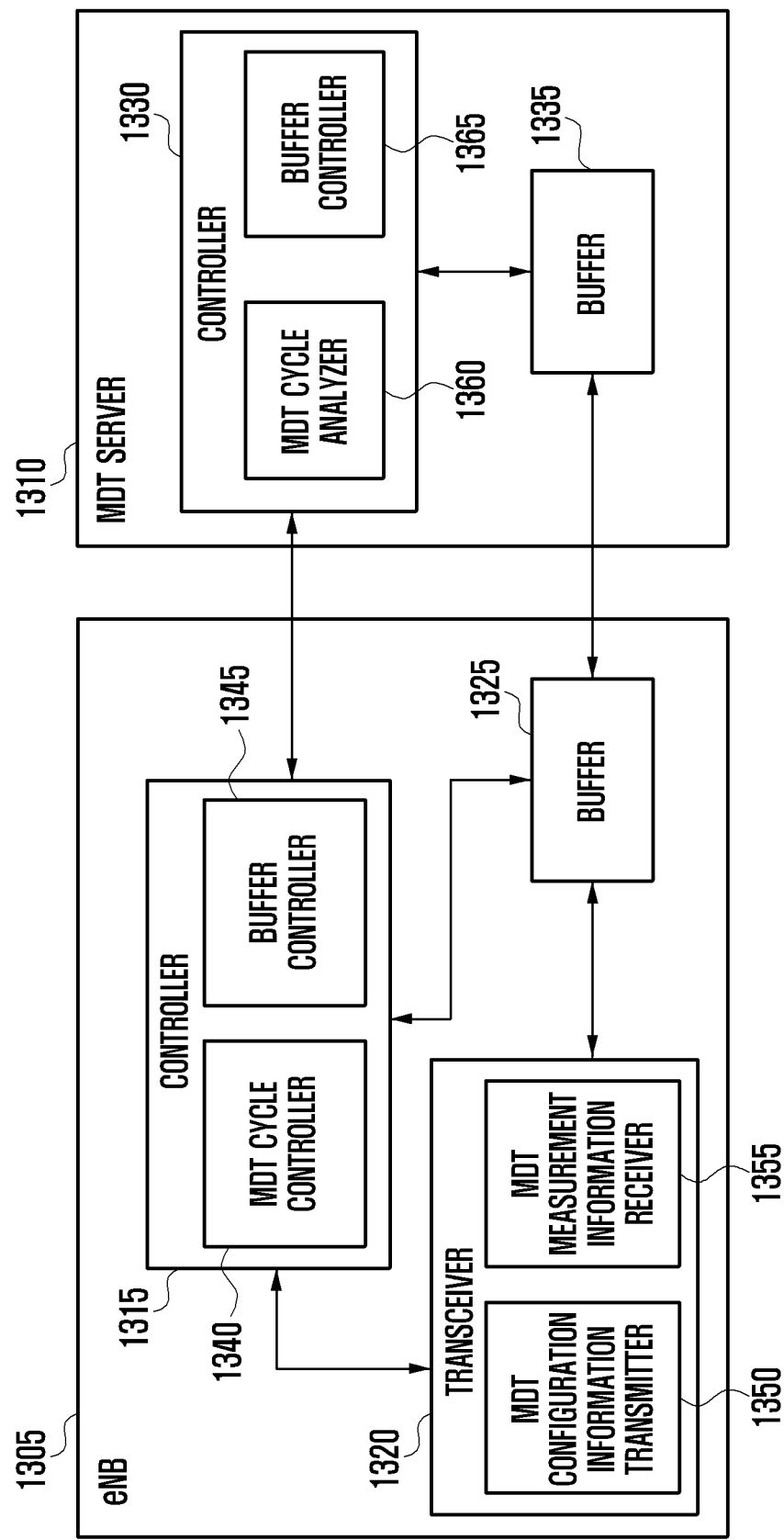
FIG. 13 is a block diagram illustrating configurations of an eNB and an MDT server according to an exemplary embodiment of the present invention.

FIG. 13 is a block diagram illustrating configurations of an eNB and an MDT server according to an exemplary embodiment of the present invention.

Referring to FIG. 13, the eNB 1305 includes a controller 1315, a transceiver 1320, and a buffer 1325. The MDT server 1310 includes a controller 1330 and a buffer 1335. An MDT measurement cycle controller 1340 of the controller 1315 of the eNB 1305 receives the MDT configuration information from the MDT server 1310 and forwards the MDT configuration information to the UE by means of the transceiver 1320. If there is the UE-recommended MDT sampling cycle, the MDT measurement controller 1340 sends the UE-recommended MDT sampling cycle to the controller 1330 of the MDT server 1310. The transceiver 1320 transmits the MDT configuration information to the UE by means of an MDT configuration information transmitter 1350 via the control channel and receives the UE-recommended MDT sampling cycle from the UE. The buffer 1325 of the eNB 1305 stores the MDT sampling information received from the UE temporarily before transmission to the buffer 1335 of the MDT server 1310, and operates under the control of a buffer controller 1345 of the controller 1315. The controller 1315 of the eNB 1305 controls the buffer 1325 for transmission to the MDT server 1310.

The controller 1330 of the MDT server 1310 generates the MDT configuration information by means of an MDT sampling cycle analyzer 1360 and provides the UE with the MDT configuration information. The controller 1330 of the MDT server 1310 also analyzes the collected MDT measurement information to reconfigure the MDT configuration information. The buffer 1335 buffers the MDT measurement information received from the UE via the eNB and operates under the control of a buffer controller 1365 of the MDT server controller 1330.

In the MDT sampling cycle determination procedure, the controller 1330 of the MDT server 1310 selects a timing to perform the MDT measurement and determines the MDT sampling cycle of the selected UE. The controller 1330 generates the MDT configuration information including the MDT measurement information and transmits the MDT configuration information to the eNB 1305. The aforementioned operation can be performed by the MDT sampling cycle analyzer 1360.

The controller 1330 of the MDT server 1310 can determine the MDT sampling cycle according to the method proposed in the fourth exemplary embodiment of the present invention. The controller 1330 determines the value of the maximum DRX cycle or an integer multiple of the DRX as the MDT sampling cycle. In this case, the MDT sampling cycle is set to a multiple of the DRX cycle of the selected UE.

Upon receipt of the MDT configuration information including the MDT sampling cycle, the controller 1315 of the eNB 1305 controls the transceiver 1320 to transmit the received MDT configuration information to the UE. That is, the MDT sampling cycle controller 1340 of the controller 1315 controls the MDT configuration information transmitter 1350 to transmit the MDT configuration information received from the MDT server 1310 to the UE.

In case that the MDT server 1310 determines the MDT sampling cycle without consideration of the DRX cycle of the UE, the MDT sampling cycle may not be an integer multiple of the DRX cycle (i.e., the MDT sampling cycle is less than or incompatible with the DRX cycle). In this case, the UE can request a change of the MDT sampling cycle with the transmission of a DRX cycle of the UE or the UE-recommended MDT sampling cycle as shown in FIG. 10. The transceiver 1320 of the eNB receives the MDT sampling cycle change request, and the MDT sampling cycle controller 1340 of the controller 1315 forwards the request to the MDT server 1310. Upon receipt of the MDT sampling cycle change request, the controller 1330 of the MDT server 1310 analyzes the DRX cycle of the UE or the UE-recommended MDT sampling cycle to determine a new MDT sampling cycle. Afterward, the controller 1330 transmits the MDT configuration information including the new MDT sampling cycle to the eNB 1305. The aforementioned operation can be performed by the MDT sampling cycle analyzer 1360 of the controller 1330.

Once the MDT sampling cycle is determined, the UE performs the MDT measurement and measurement result recording at the determined MDT sampling cycle. The MDT measurement result is recorded along with the measurement time, and the measurement time can be the time of the execution of MDT measurement in the form of relative or absolute time. The UE sends the recorded MDT measurement information to the eNB 1305 in connected mode. The MDT measurement information receiver 1355 of the eNB transceiver 1320 receives the MDT measurement information, and the MDT sampling cycle controller 1340 forwards the MDT measurement information to the buffer controller 1345 such that the buffer controller 1345 stores the MDT measurement information. The MDT sampling cycle controller 1340 sends the received MDT measurement information to the MDT server 1310. Upon receipt of the MDT measurement information, the buffer controller 1330 of the MDT server 1310 stores the received MDT measurement information in the buffer 1335.

Although the description is directed to the case where the MDT sampling cycle is determined by the MDT server 1310, the MDT sampling cycle can be determined by the eNB 1305.

In the following, DRX denotes a discontinuous reception interval, MDT can be a radio channel measurement cycle, and the MDT server can be the channel measurement server.

In the radio channel measurement cycle determination method for a mobile communication system according to an exemplary embodiment of the present invention, the UE determines the DRX cycle first and receives the MDT sampling cycle information from the eNB. Afterward, the UE compares the DRX cycle and the MDT sampling cycle with each other and, if the MDT sampling cycle is an integer multiple of the DRX cycle, synchronizes the MDT sampling cycle with the DRX cycle according to one of the methods proposed in the second and third exemplary embodiments. The UE measures the radio channel and records the measurement records at the timings of the DRX cycle and the MDT sampling cycle.

At the timings when the MDT sampling cycle does not match with the DRX cycle, the UE skips measuring the radio channel and recording the measurement result as described with reference to FIG. 7 or records the latest measurement result as the current measurement result without measuring radio channel as described with reference to FIG. 8 in the second exemplary embodiment. Meanwhile, if the MDT sampling cycle is not an integer multiple of the DRX cycle, the UE transmits the DRX cycle information to the eNB, and the eNB resets the MDT sampling cycle with reference to the received DRX cycle information as described with reference to FIG. 10 in the third exemplary embodiment.

In case that the MDT sampling cycle is an integer multiple of the DRX cycle, the UE measures the radio channel and records the measurement result at the MDT sampling cycle.

In the radio channel measurement cycle control method for a mobile communication system according to an exemplary embodiment of the present invention, the channel MDT server selects a UE to perform the MDT measurement, determines the MDT sampling cycle to be equal to an integer multiple of the DRX cycle of the selected UE, and transmits the MDT configuration information including the determined MDT sampling cycle to the UE such that the UE performs the MDT measurement at the timings when the MDT sampling cycle matches with the DRX cycle.

The MDT sampling cycle determination of the MDT server can be performed in such a manner that the MDT server queries the MME for the DRX cycle and sets the MDT sampling cycle to a value equal to an integer multiple of the DRX cycle as described in the first exemplary embodiment with reference to FIG. 6. Also, it is possible to set the MDT sampling cycle to be a multiple of the DRX cycle as described in the fourth exemplary embodiment with reference to FIG. 11.

As described above, an exemplary MDT control method of the present invention synchronizes the MDT sampling cycle at which the UE measures the radio channel for optimizing the service of the mobile terminal with the DRX cycle of the UE in standby mode so as to minimize the number of wakeups of the receiver of the UE, resulting in reduction of the power consumption of the UE.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a terminal to measure a radio channel in a mobile communication system, the method comprising:
receiving a discontinuous reception (DRX) cycle from a base station;

receiving a minimization of drive test (MDT) cycle;
identifying whether a period for MDT measurement in the MDT cycle overlap with a DRX on duration in the DRX cycle;
measuring, if the period for MDT measurement overlap with the DRX on duration, the radio channel at the period for MDT measurement overlapping with the DRX on duration; and
skipping, if the period for MDT measurement does not overlap with the DRX on duration, measurement of the radio channel.

2. The method of claim 1, further comprising:
selecting, at an MDT server, the terminal to perform MDT;
determining the DRX cycle of the terminal; and
setting the MDT cycle to an integer multiple of the DRX cycle.

3. The method of claim 1, further comprising:
determining whether the MDT cycle is an integer multiple of the DRX cycle;
measuring, when the MDT cycle is not an integer multiple of the DRX cycle, the radio channel at the period for MDT measurement timings overlapping with DRX on duration and storing a result of the measurement; and
recording a last measurement result at the period for MDT measurement not overlapping with the DRX on duration without measuring the radio channel.

4. The method of claim 1, wherein the identifying comprises:
determining whether the MDT cycle is an integer multiple of the DRX cycle;
requesting, when the MDT cycle is not an integer multiple of the DRX cycle, the base station to reset the MDT cycle to an integer multiple of the DRX cycle; and
receiving the MDT cycle reset to the integer multiple of the DRX cycle.

5. The method of claim 1, further comprising:
setting, at an MDT server, the MDT cycle to an integer multiple of a maximum DRX cycle; and
notifying the terminal of the MDT cycle,
wherein the MDT cycle is determined based on the DRX cycle by the MDT server.

6. The method of claim 1, wherein the measuring the radio channel comprises performing measurement of the radio channel at each of the periods for MDT measurement, if the MDT cycle is an integer multiple of the DRX cycle.

7. The method of claim 1, further comprising:
storing a result of the measurement.

8. The method of claim 1, further comprising:
determining whether the MDT cycle is an integer multiple of the DRX cycle; and
measuring, if the MDT cycle is not an integer multiple of the DRX cycle, the radio channel at the period for MDT measurement overlapping with the DRX on duration and storing measurement result.

9. A method for performing minimization of drive text (MDT) in a mobile communication system, the method comprising:
setting, between a user equipment (UE) and a base station, a discontinuous reception (DRX) cycle based on a UE-specific DRX cycle and a cell-specific DRX cycle;
selecting, at an MDT server, the UE to measure a radio channel;
requesting, at the MDT server, a mobility management entity (MME) for the DRX cycle of the UE;
determining an integer multiple of the DRX cycle received from the MME;
transmitting the integer multiple of the DRX cycle to the UE as the MDT cycle;
measuring, at the UE, the radio channel at a period for MDT measurement in the MDT cycle overlapping with a DRX on duration in the DRX cycle and skipping the measuring, at the UE, the radio channel at the period for MDT measurement not overlapping with the DRX on duration; and
storing a result of the measurement,
wherein the MDT cycle is determined based on the DRX cycle by the MDT server.

10. The method of claim 9, further comprising:
setting, at the MDT server when the MDT cycle is longer than a maximum DRX cycle of the UE, the MDT cycle to an integer multiple of the maximum DRX cycle; and
transmitting the MDT cycle to the UE.

11. The method of claim 10, further comprising transmitting, when the UE connects to the base station, the result of the measurement from the UE to the MDT server.

12. An apparatus for measuring a radio channel in a mobile communication system, the apparatus comprising:
a transmitter for communicating with a base station; and
a controller configured to control to receive a discontinuous reception (DRX) cycle from the base station, to receive a minimization of drive test (MDT) cycle, to identify whether a period for MDT measurement in the MDT cycle overlap with a DRX on duration in the DRX cycle, to measure, if the period for MDT measurement overlap with the DRX on duration, the radio channel at the period for MDT measurement overlapping with the DRX on duration, and to skip, if the period for MDT measurement does not overlap with the DRX on duration, measurement of the radio channel.

13. The apparatus of claim 12, wherein the mobile communication system comprises an MDT server for selecting a terminal to perform MDT, for requesting the base station for the DRX cycle of the selected terminal, for selecting an integer multiple of the DRX cycle as the MDT cycle, and for transmitting the MDT cycle to the terminal.

14. The apparatus of claim 12, wherein the controller is further configured to determine whether the MDT cycle is an integer multiple of the DRX cycle, to measure, when the MDT cycle is not an integer multiple of the DRX cycle, the radio channel at the period for MDT measurement overlapping with the DRX on duration and stores a result of the measurement and, to record a last measurement result without measuring the radio channel at the period for MDT measurement not overlapping with the DRX on duration.

15. The apparatus of claim 12, wherein the controller is further configured to determine whether the MDT cycle is an integer multiple of the DRX cycle, to request, when the MDT cycle is not an integer multiple of the DRX cycle, the base station to reset the MDT cycle to an integer multiple of the DRX cycle and to receive the MDT cycle reset to the integer multiple of the DRX cycle.

16. The apparatus of claim 12, wherein the mobile communication system comprises an MDT server for setting, at the MDT server, the MDT cycle to an integer multiple of a maximum DRX cycle and for notifying the terminal of the MDT cycle,
wherein the MDT cycle is determined based on the DRX cycle by the MDT server.

17. The method of claim 12, wherein the controller is further configured to measure the radio channel at each of the periods for MDT measurement, when the MDT cycle is an integer multiple of the DRX cycle.

18. The method of claim 12, wherein the controller is further configured to store a result of the measurement.

* * * * *